United States Patent
Krishnaswamy (10) Patent No.: US 9,537,754 B2
(45) Date of Patent: Jan. 3, 2017

(54) METHOD AND APPARATUS FOR FINDING DIVERSE PHYSICAL LAYER PATHS IN NETWORKS

(75) Inventor: Murali Krishnaswamy, Temple Terrace, FL (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 179 days.

(21) Appl. No.: 13/333,225

(22) Filed: Dec. 21, 2011

(65) Prior Publication Data

US 2013/0163465 A1    Jun. 27, 2013

(51) Int. Cl.
 *H04L 12/735* (2013.01)
 *H04L 12/707* (2013.01)
 *H04L 12/851* (2013.01)
 *H04L 12/26* (2006.01)

(52) U.S. Cl.
 CPC ............. *H04L 45/128* (2013.01); *H04L 45/22* (2013.01); *H04L 47/2425* (2013.01); *H04L 12/26* (2013.01)

(58) Field of Classification Search
 CPC .... H04L 45/128; H04L 45/22; H04L 47/2425; H04L 12/26
 See application file for complete search history.

(56) References Cited

U.S. PATENT DOCUMENTS

| | | | |
|---|---|---|---|
| 2002/0181393 A1* | 12/2002 | Grover et al. | 370/225 |
| 2005/0113098 A1* | 5/2005 | Cankaya et al. | 455/446 |
| 2006/0002291 A1* | 1/2006 | Alicherry et al. | 370/225 |
| 2007/0014247 A1* | 1/2007 | Ou et al. | 370/254 |
| 2007/0101015 A1* | 5/2007 | Larsson et al. | 709/238 |
| 2010/0061721 A1* | 3/2010 | Kotrla | H04L 41/5019 398/9 |
| 2010/0172236 A1* | 7/2010 | Madrahalli et al. | 370/225 |

* cited by examiner

*Primary Examiner* — Walter Divito (57) ABSTRACT

An approach for finding cost effective network connections while maintaining physical layer diversity is described. A logical segment within a path between a start node and an end node of a network is determined. A plurality of physical connections of the logical segment is then determined, wherein each of the physical connections is associated with a cost value, selecting one of the physical connections of the logical segment based on the cost values. A determination is made of another logical segment between the start node and the end node to include another physical connection, wherein the another logical segment is diverse physically with respect to the logical segment.

20 Claims, 10 Drawing Sheets

METHOD AND APPARATUS FOR FINDING DIVERSE PHYSICAL LAYER PATHS IN NETWORKS

BACKGROUND INFORMATION

Networks enable the sharing and transmission of a wide array of resources between network elements (also called nodes). These networks provide essential data services to a variety users (e.g., home, business, etc.) and for a variety of purposes (e.g., web browsing, streaming video, etc.). To support these demands, networks are designed to be highly reliable. Thus, networks are typically designed to use multiple diverse routes (e.g., short span, within a network region, etc.) to ensure cost effective continued operation. End-to-end diversity between the multiple routes (e.g., working and protection paths) is typically achieved by ensuring the use of different nodes between routes (e.g., link-node diverse paths). However, these diverse nodes frequently share physical elements, such as cables, manholes, huts, poles and the like, whereby this sharing of physical elements causes a lack of diversity at the physical layer, resulting in a lower overall network reliability.

Based on the foregoing, there is a need for improved approaches to obtaining end-to-end physical layer path diversity within networks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and system for finding network connections to provide physical layer diversity is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to shortest path first (SPF) algorithms, it is contemplated that other equivalent graph search algorithms may be used.

Figure 1:
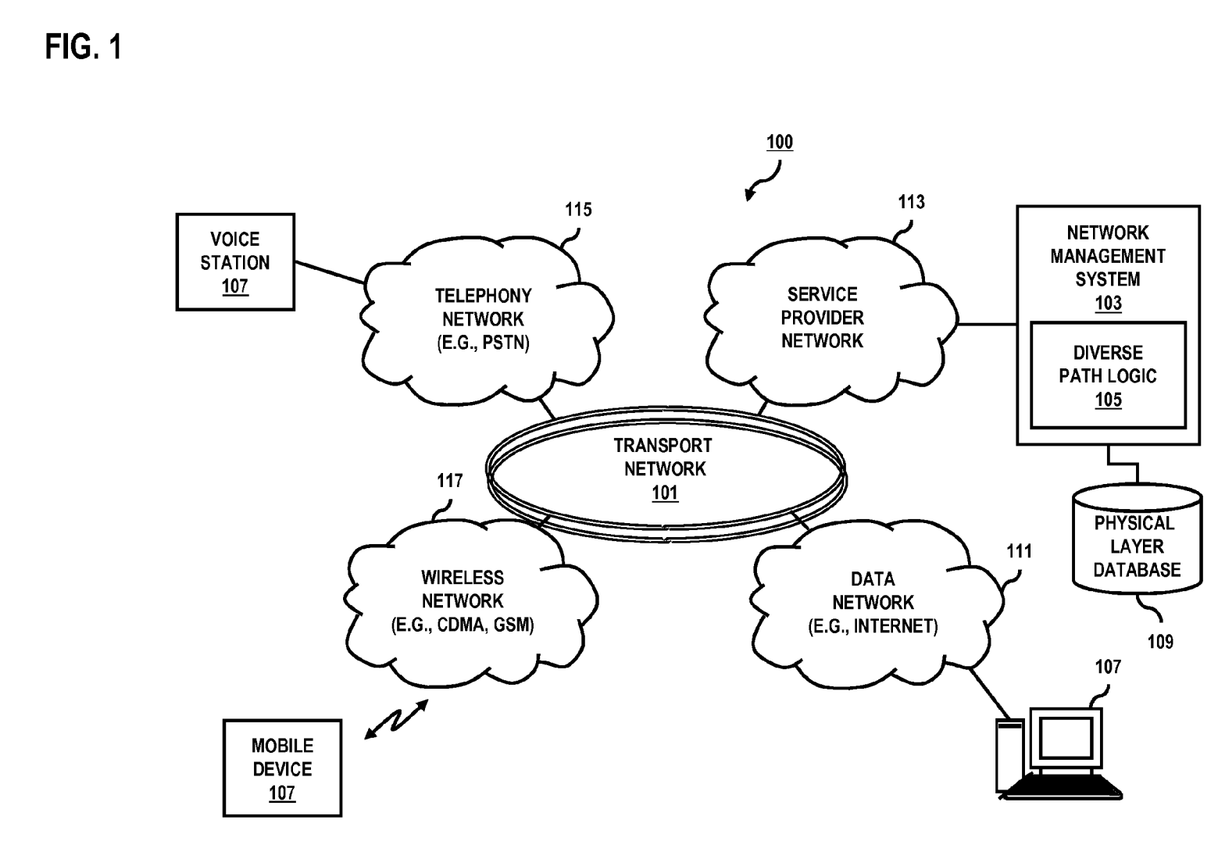
FIG. 1 is a diagram of a communication system capable of finding diverse network connections while maintaining physical layer diversity, according to various embodiments.

FIG. 1 is a diagram of a communication system capable of determining diverse physical layer paths, according to various embodiments. For illustrative purposes, system 100 is described with respect to finding diverse physical layer paths in transport network 101. In this example, a network management system 103 employs a diverse path logic 105 configured to determine physically diverse paths, while taking into account physical layer specific features and user policies. The system 103 maintains a database 109 to store information relating to the physical layer of network 101. In this manner, the network management system 103 is configured to select a physical segment for each logical segment of a logical path to enable physical layer diversity within logical paths, and between logical paths.

According to certain embodiments, the network 101 provides a transport network for various end user devices 107 (e.g., computing device, voice station 107, and/or another mobile device) to communicate. The network 101 can interconnect one or more networks, such as data network 111, service provider network 113, telephony network 115, and/or wireless network 117. This network 101, in one embodiment, may be a part of the service provider network 113 in providing a backbone network to the various networks 111-117.

As such, the network 113 may operate using a host of technologies, such as asynchronous transfer mode (ATM) network, frame relay network, integrated services digital network (ISDN), Internet Protocol (IP) network, multiprotocol label switching (MPLS) network, or synchronous optical network (SONET), as well as any other suitable technologies.

Networks 111-117 may be any suitable wireline and/or wireless network. For example, telephony network 115 may include a circuit-switched network, such as the public switched telephone network (PSTN), an integrated services digital network (ISDN), a private branch exchange (PBX), or other like network. Wireless network 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111-117 may be completely or partially contained within one another, or may embody one or more of the aforementioned infrastructures. For instance, service provider network 113 may embody circuit-switched and/or packet-switched networks that include facilities to provide for transport of circuit-switched and/or packet-based communications. It is further contemplated that networks 111-117 may include components and facilities to provide for signaling and/or bearer communications between the various components or facilities of system 100. In this manner, networks 111-117 may embody or include portions of a signaling system 7 (SS7) network, or other suitable infrastructure to support control and signaling functions.

According to exemplary embodiments, end user devices 107 may include any customer premise equipment (CPE) capable of sending and/or receiving information over one or more of networks 111-117. For instance, voice terminal 107 may be any suitable plain old telephone service (POTS) device, facsimile machine, etc., whereas mobile device (or terminal) 107 may be any cellular phone, radiophone, satellite phone, smart phone, wireless phone, or any other suitable mobile device, such as a personal digital assistant (PDA), pocket personal computer, tablet, customized hardware, etc. Further, computing device 107 may be any suitable computing device, such as a VoIP phone, skinny client control protocol (SCCP) phone, session initiation protocol (SIP) phone, IP phone, personal computer, softphone, workstation, terminal, server, etc.

To assist with traffic engineering, service providers negotiate and apportion network capacity on general or subscriber-specific bases through service level agreements (SLA). These agreements define various communication service parameters in terms of bandwidth allocations, latency, jitter, etc. and may be enforced using network management system 103. Units of data (e.g., blocks, cells, frames, packets, etc.) transmitted across the network 101 can be typically "policed" according to one or more committed rates of service, such as a committed burst bandwidth. These committed rates of service are generally associated with particular connection(s), e.g., links, pathways, etc., or other network parameters, e.g., incoming/outgoing interface, destination/source node, machine access control address, etc.

Physical layer determinations of the optimal flow path (or shortest path) can be based on network cost and/or metrics values that are preassigned between nodes (e.g., network elements) of the network 101 based on factors such as physical distance between nodes and other factors that determine normal latency between nodes. The network elements can be any type of equipment that processes communication traffic—e.g., routers, switches, etc. If a failure occurred at any point along the flow path (e.g., SONET) within network 101, then SONET add/drop multiplexers (ADMs), in conjunction with the network management system 103, can transparently reroute traffic along a different path (e.g., a protection path) to achieve the same final destination as originally planned.

In certain embodiments, network 101 may be interconnected with other networks. For numerous applications, connection paths between nodes in the network 101 need to be determined over a multitude of networks. To optimize the use of network resources, the connection path is, according to one embodiment, the shortest path between a start node and an end node in the network 101. This shortest path may include one or more intermediate nodes and the connecting links between nodes.

A number of well known methods and algorithms can be used to determine the shortest paths between nodes with mesh networks; for example, the Dijkstra algorithm. These algorithms used for mesh networks can similarly be applied to networks for calculating shortest paths. One drawback of employing this practice, however, is that many of the components in the physical layer are transparent to these approaches. The result is that the computed shortest paths lack physical layer diversity resulting in a decrease in reliability.

Therefore, the approach of system 100, according to certain exemplary embodiments, stems from the recognition that traditional applications of shortest path algorithms to obtain physical layer diversity are ineffective.

As shown, the network management system 103 possesses the capability, via logic 105, to find paths (e.g., shortest) with physical layer diversity in network 101. Exemplary configurations for transport network 101 are illustrated in FIGS. 2 and 3.

Figure 2:
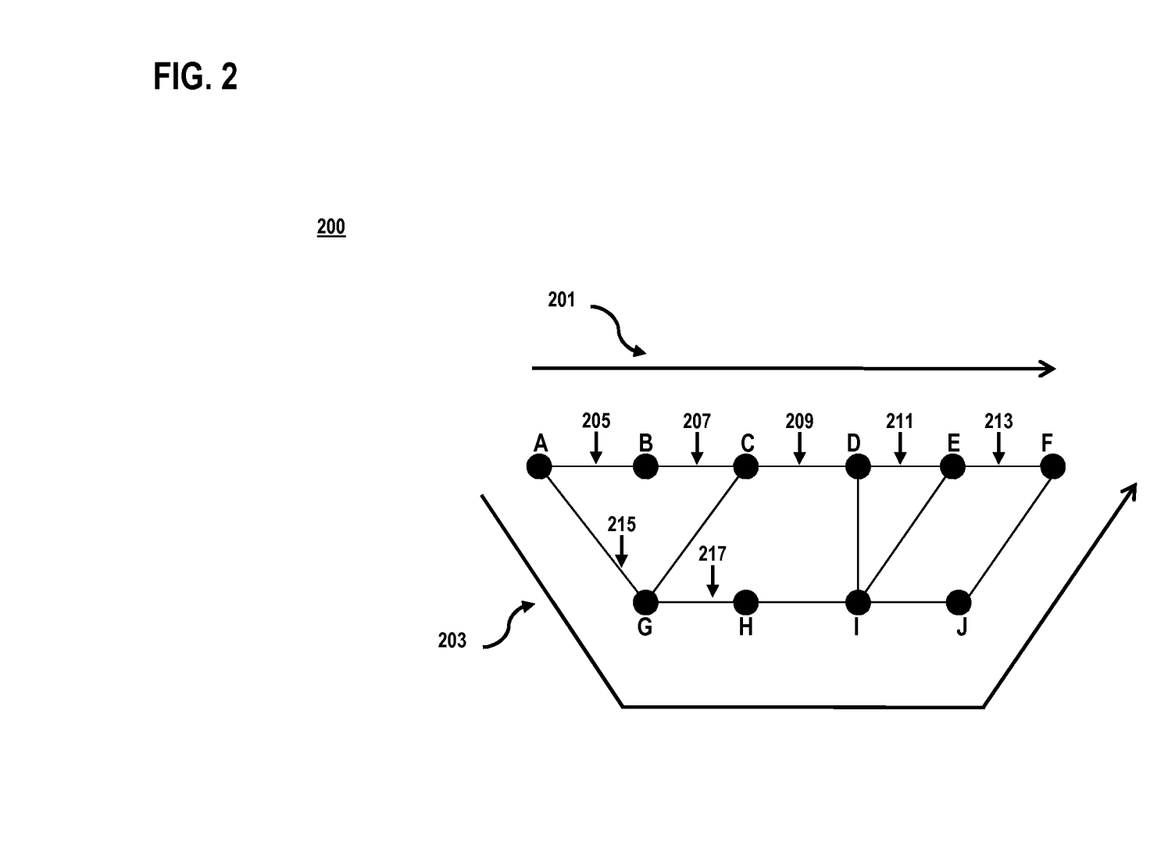
FIG. 2 is a diagram of an exemplary logical layer of the transport network of FIG. 1.

By way of example, FIG. 2. illustrates a network 200, where nodes a and f are connected by multiple node diverse paths. A primary path (or working path) 201 includes nodes a, b, c, d, e, and f. A secondary path (or protection path) 203 includes nodes a, g, h, i, j, and f. Each node in the network 200 receives data from a neighboring node and forwards data to an adjacent node. Transmission between nodes may occur in any direction (e.g., bidirectional). Primary and secondary paths are configured for a logical segment, for example logical segment 205 located between node a and node b, within one path to be diverse from another path. In this manner, a loss of connectivity in a logical segment does not result in a loss of connectivity between a start node (e.g., node a) and end node (e.g., node f). By way of example, loss of connectivity in the logical segment 205 results in a loss of connectivity in the primary path 201, but not in the secondary path 203. For many applications, it is desirable to find a diverse path to ensure continued operation during link or equipment failures.

Corresponding to each logical segment there are fibers or cables geographically routed through various regions, streets, manholes and the like. As noted, the logical connections have no awareness of the components of the physical layer.

Figure 3:
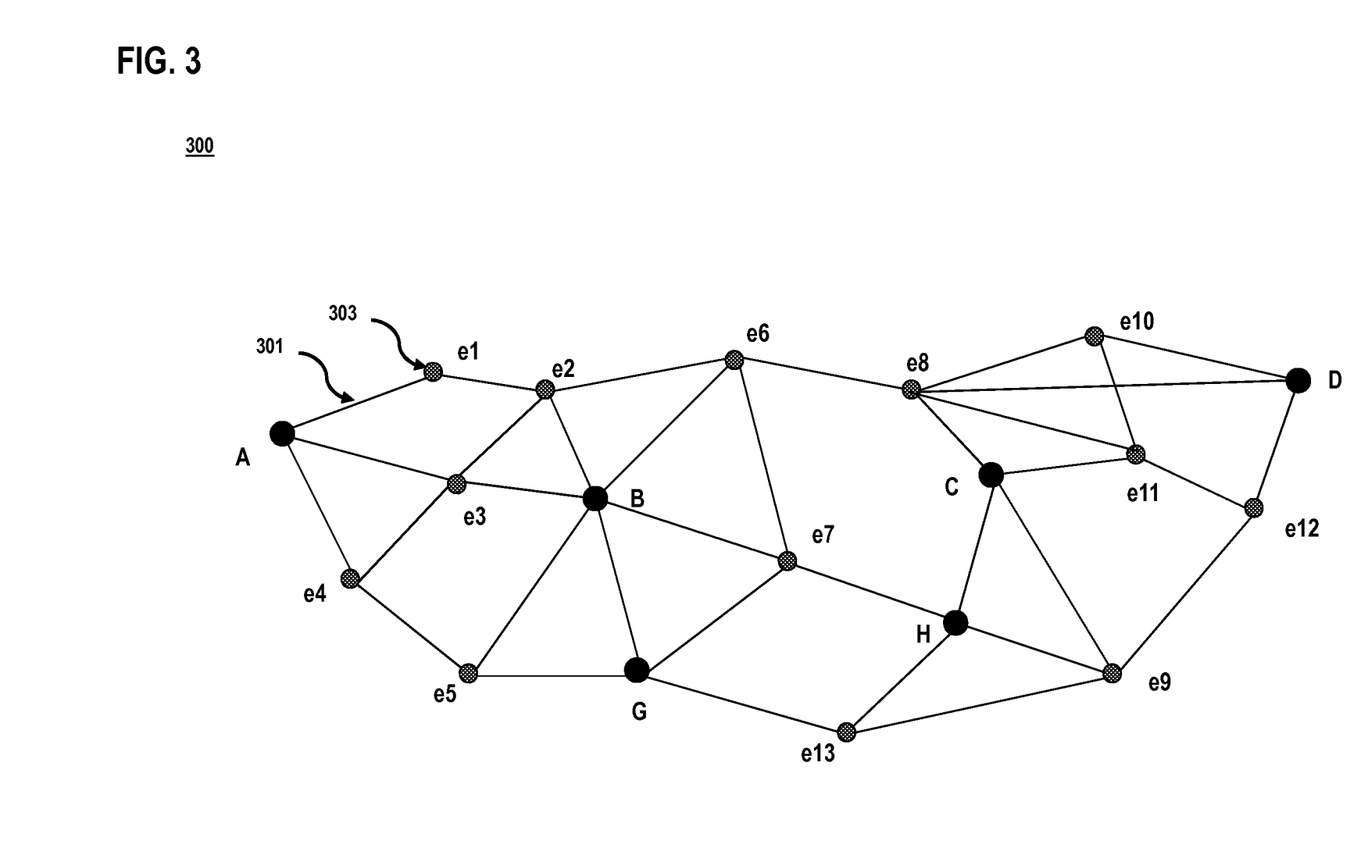
FIG. 3 is a diagram of an exemplary physical layer constituting a portion of the network of FIG. 2.

FIG. 3 is a diagram of an exemplary physical layer constituting a portion of the network of FIG. 2. Each logical segment shown in FIG. 2 includes interconnected physical media, such as cables and fiber, going through physical entities. The physical layer includes a physical segment 301 that connects physical entity 303. As used herein, physical segment and physical connection includes cables like optical fiber cable, and physical entities includes manholes, huts, offices, poles, and the like. Each logical segment includes one or more physical media and one or more physical entities. For example, the logical segment 205, connecting nodes a and b, includes one or more physical segments, such as the connection from node a to entity e3 to node b, the connection from node a to entity e1 to entity e2 to node b, and the connection from node a to entity e4 to entity e5 to node b. In the event of a connection failure, network availability can be maintained through diversity of physical elements and/or links. That is, a loss of a single physical element (such as a physical segment or physical entity (e.g., equipment)) should not result in loss of connectivity in another path, or in another logical segment within the same logical path. For example, if the primary path 201 includes a logical segment that includes entity e3 for connecting nodes a and b, then the secondary path should use entities e4 and e5 (or entities e1 and e2) to physically connect the logical segment from node a to node g. In this manner, the loss of one physical entity, entity e3, avoids failure in both the primary and secondary paths, or in multiple logical segments within the same logical path.

Although the process executed by diverse path logic 105 is discussed with respect to connecting end-to-end nodes using primary and secondary paths, the process may also be applied to end-to-end nodes using a single primary path (no secondary path), or three or more redundant paths. In certain embodiments, the process of selecting physically diverse segments within a single path enables a reduced number of reroutes necessary to establish an end-to-end connection. By way of example, a single loss of connectivity at a physical entity in the physical layer results in loss of connectivity at every logical segment containing the physical entity.

As mentioned, traditional methods for determining shortest paths (SPFs) within networks fail to take into account diversity at the physical layer. In some cases it may be necessary to find two or more SPFs that are L-N (Link-Node) disjoint from each other where the SPFs do not share a common node or link along their path. In this case the SPF with the lowest "value or cost" can be designated as the working path for the connection between the two nodes, whereas the other SPF(s) would be used as the protection path(s).

The path that satisfies a predefined criteria (e.g., the lowest total "cost") between a pair of nodes is deemed the SPF between them. For instance, the total cost can be the summation of individual costs between adjacent nodes along the path. Various parameters (individually or in combination), which be weighted, may be used as the metric. By way of example, these parameters may include: physical distance between nodes, number of nodes along the path, type of nodes, bandwidth of the links, percentage utilization of the links, set policies, etc.

While specific reference will be made hereto, it is contemplated that network 101 may embody many forms and include multiple and/or alternative components and facilities.

Figure 4:
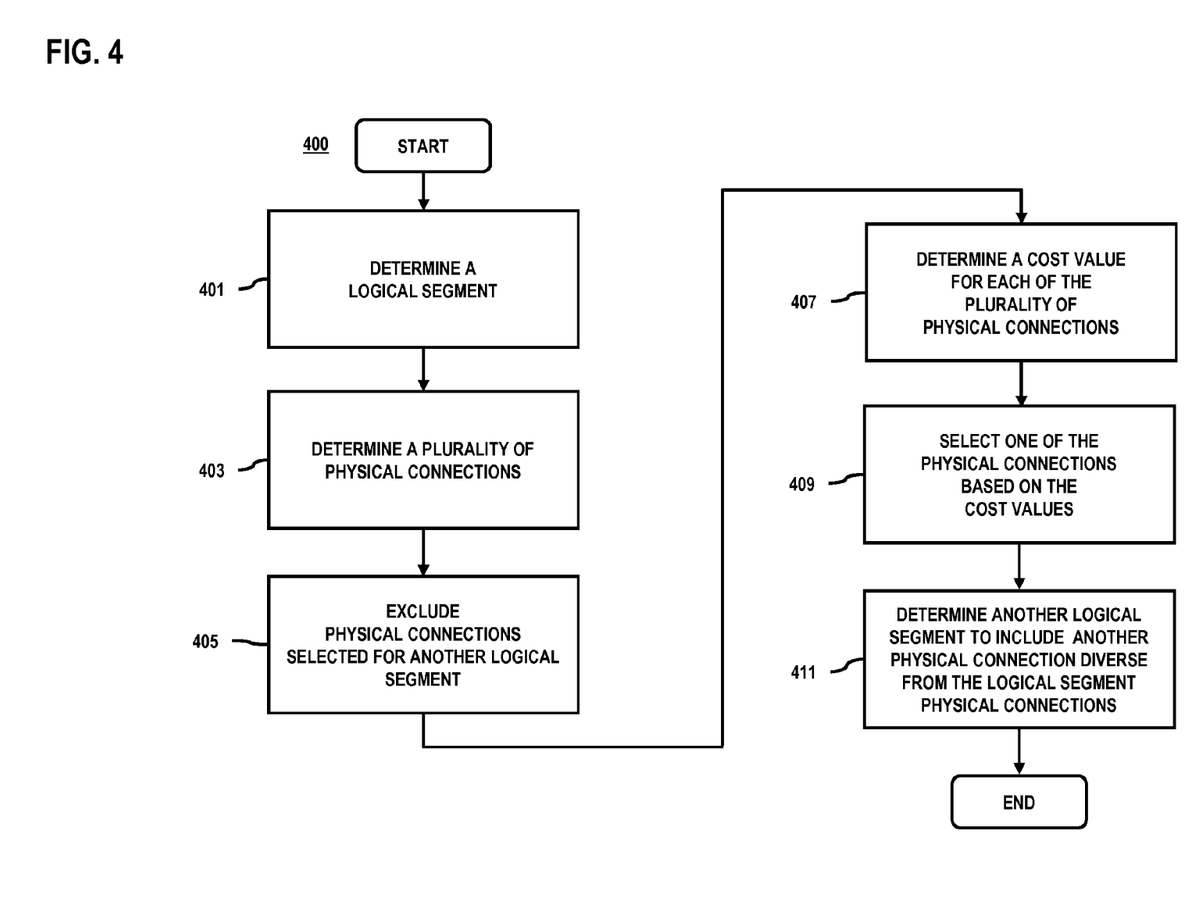
FIG. 4 is a flowchart of a process for finding diverse network connections while maintaining physical layer diversity, according to one embodiment.

FIG. 4 is a flowchart of a process for finding cost effective network connections while maintaining physical layer diversity, according to one embodiment. For illustrative purpose, process 400 is described with respect to the system of FIG. 1 employing the topologies shown in FIGS. 2 and 3. It is noted that the steps of process 400 may be performed in any suitable order, as well as combined or separated in any suitable manner. In certain embodiments, the process involves a two-stage approach: first stage to determine an optimal flow path in selecting a logical segment, and a second stage to select a physical segment in the physical layer. In step 401, the process determines a logical segment within a path between a start node (e.g., node a) and an end node (e.g., node f) of network 200. According to one embodiment, primary and secondary paths can be determined using a Dijkstra type algorithm. In this example, connectivity between nodes a and f is determined to be optimal along a primary logic path 201 through nodes a, b, c, d, e, and f, and along a secondary logic path 203 through nodes, a, g, h, i, j, and f. In certain embodiments, path logic 105 utilizes the Dijkstra's algorithm (Table 1) to assist with determining an optimal path with physical diversity as a consideration:

TABLE 1

```
1   function Dijkstra(Graph, source):
2       for each vertex v in Graph:           // Initializations
3           dist[v] := infinity               // Unknown distance function
                                                 from source to v
4           previous[v] := undefined          // Previous node in optimal
                                                 path from source
5       dist[source] := 0                     // Distance from source to source
6       Q := the set of all nodes in Graph
        // All nodes in the graph are unoptimized - thus are in Q
7       while Q is not empty:                 // The main loop
8           u := vertex in Q with smallest dist[ ]
9           if dist[u] = infinity:
10              break                         // all remaining vertices are
                                                 inaccessible from    source
11          remove u from Q
12          for each neighbor v of u:         // where v has not yet been
                                                 removed from Q.
13              alt := dist[u] + dist_between(u, v)
14              if alt < dist[v]:             // Relax (u,v,a)
15                  dist[v] := alt
16                  previous[v] := u
17      return dist[ ]
```

As noted, each path includes multiple logical segments that connect the various nodes. For example, the primary logical path 201 illustrated in FIG. 2. includes logical segment ($L_1$) 205 connecting nodes a and b, logical segment ($L_2$) 207 connecting nodes b and c, logical segment ($L_3$) 209 connecting nodes c and d, logical segment ($L_4$) 211 connecting nodes d and e, and logical segment ($L_5$) 213 connecting nodes e and f. Additionally, the secondary logical path 203 illustrated in FIG. 2. includes logical segment ($L_6$) 215 connecting nodes a and g, logical segment ($L_7$) 217 connecting nodes g and h, etc. The order in which the logical segments contained in the primary and secondary paths may be varied. For example, in one embodiment, logical segment 205 is selected first, followed by logical segment 207 and so forth. In another example, logical segment 213 is selected first, followed by logical segment 211, and so forth. The significance of the order is discussed further with respect to FIGS. 7, 8A, and 8B.

Once the logical segment is determined the process determines, as in step 403, physical connections or physical segments capable of connecting the selected logical segment. In the exemplary embodiment, as shown in FIG. 3, nodes a and b may be connected by multiple connections such as via entity e3, via entities e4, and e5, via entities e1 and e2 and so forth. In this manner, physical segments or physical connections are made available for further processing such as associating a cost value and removing unsatisfactory connections. An exemplary list of physical segments (i.e., $f_{11}$, $f_{12}$, $f_{13}$, etc.) of step 403 (with a maximum of three physical entities), as applied to the exemplary embodiment shown in FIG. 2, is shown in Table 2:

TABLE 2

| $L_1$ LS(A-B) | $L_2$ LS(B-C) | $L_3$ LS(C-D) | $L_4$, $L_5$ | $L_6$ LS(A-G) | $L_7$ LS(G-H) | $L_8$, $L_9$, $l_{10}$ |
|---|---|---|---|---|---|---|
| $f_{11}$ A-e3-B | $f_{21}$ B-e6-e8-C | $f_{31}$ C-e8-D | Not Shown | $f_{61}$ A-e4-e5-G | $f_{71}$ G-e7-H | Not Shown |
| $f_{12}$ A-e1-e2-B | $f_{22}$ B-e2-e6-e8-C | $f_{32}$ C-e8-e10-D | | $f_{62}$ A-e3-e4-e5-G | $f_{72}$ G-e13-H | |
| $f_{13}$ A-e3-e2-B | $f_{23}$ B-e7-e6-e8-C | $f_{33}$ C-e9-e12-D | | | $f_{73}$ G-e13-e9-H | |
| $f_{14}$ A-e4-e3-B | $f_{24}$ B-e6-e8-e11-C | $f_{34}$ C-e11-e8-D | | | | |
| $f_{15}$ A-e4-e5-B | | $f_{35}$ C-e11-e10-D | | | | |

TABLE 2-continued

| L$_1$ LS(A-B) | L$_2$ LS(B-C) | L$_3$ LS(C-D) | L$_4$, L$_5$ | L$_6$ LS(A-G) | L$_7$ LS(G-H) | L$_8$, L$_9$, l$_{10}$ |
|---|---|---|---|---|---|---|
| f$_{16}$ A-e1-e2-e3-B | | f$_{36}$ C-e11-e12-D | | | | |
| f$_{17}$ A-e1-e2-e6-B | | f$_{37}$ C-e8-e11-e10-D | | | | |
| f$_{18}$ A-e3-e2-e6-B | | f$_{38}$ C-e8-e11-e12-D | | | | |
| f$_{19}$ A-e4-e3-e2-B | | f$_{39}$ C-e11-e8-e10-D | | | | |

Once the physical connections capable of connecting the selected logical segment are determined, the process excludes, as in step 405, physical connections selected for another logical segment. That is, the physical diversity is maintained by removing from consideration physical elements already in use. For example, if physical entity e2 is used in connecting nodes a and b, then all physical segments containing entity e2 are removed from consideration for other logical segments. In this manner, diversity in the physical layer is achieved.

Once physical connections selected for another logical segment are excluded the process determines, as in step 407, a metric (e.g., cost value) for each of the physical connections capable of connecting the selected logical segment and not excluded by step 405 (or by the process described in FIG. 5) is defined. In one embodiment, the process, as executed by path logic 105, can retrieve physical layer information (which can specify physical entities and physical segments) associated with the network 101 from the physical layer database 109. The cost value can be determined by assigning various weights to physical elements associated with physical layer information. In one embodiment, the cost value is based on the number of physical entities; and the Dijkstra algorithm is executed with a link cost of each physical segment equal to one. In another embodiment, the cost value is based on the span length of physical media (e.g., fiber optic cable) in the physical segment and the Dijkstra algorithm is executed with a link cost of each physical segment equal to associated physical span length parameter stored in physical layer database 109. Other considerations may impact a cost value such as the crossing of regional, state, street, local access and transport area boundaries, or the connecting to a central office or wire center. For example, an expense for crossing a regional boundary can be added to the result of the Dijkstra to enable an accurate representation of cost value of physical segments crossing the regional boundary. Trimming or pruning of the list to reduce the computation effort is discussed further with respect to FIG. 5.

Once the process determines a cost value for each of the physical connections, it selects, as in step 409, one of the physical connections based on the cost values. As noted, cost efficiency is desired in the configuration networks. Thus, in most cases the physical segment associated with the lowest cost value is selected, unless such a physical segment is trimmed or pruned from the list as discussed with regards to FIG. 5. For example, if the number of physical entities represents cost value, then the physical connection selected for logical segment 205 may be f$_{11}$, because f$_{11}$ includes the fewest number of physical entities. Alternatively, if, as discussed with respect to FIG. 5, entity e3 is excluded or pruned, then f$_{12}$ and f$_{15}$ represent the lowest cost value. In cases where multiple physical segments represent the lowest cost value, a user preference information may be used to select the physical segment. For example, in the exemplary embodiment f$_{12}$ is selected because its first entity is numbered lower than the first entity in f$_{15}$.

Once the process 400 determines the physical connection for the determined logical segment, process 400 then determines, as in step 411, another logical segment to include another physical connection that is physically diverse from the determined physical connection for the determined logical segment. The process 400 is repeated for another logical segment in the path or another path connecting the start node to the end node until an end-to-end physical path is determined for each end-to-end logical path. By way of example, once the process 400 selects physical segments for connecting logical segment 205 (e.g., from node a to physical entity e1 to physical entity e2 to node b), process 400 then repeats in selecting physical segments for connecting a logical segment between nodes b and c. In the example, the physical elements used for connecting logical segment 205 (e.g., entities e1, and e2, physical segment 301, and a physical segment connecting entities e1 and e2, and a physical segment connecting entity e2 and node b) are excluded from the determining of cost value and are not selected as physical elements for connecting a logical segment between nodes b and c. The same process is used to select physical elements for connecting a logical segment between nodes in the secondary or protection path (e.g., secondary path 203). In this manner, physical diversity is achieved between each segment contained in the primary and secondary paths to enable physical layer diversity.

Figure 5:
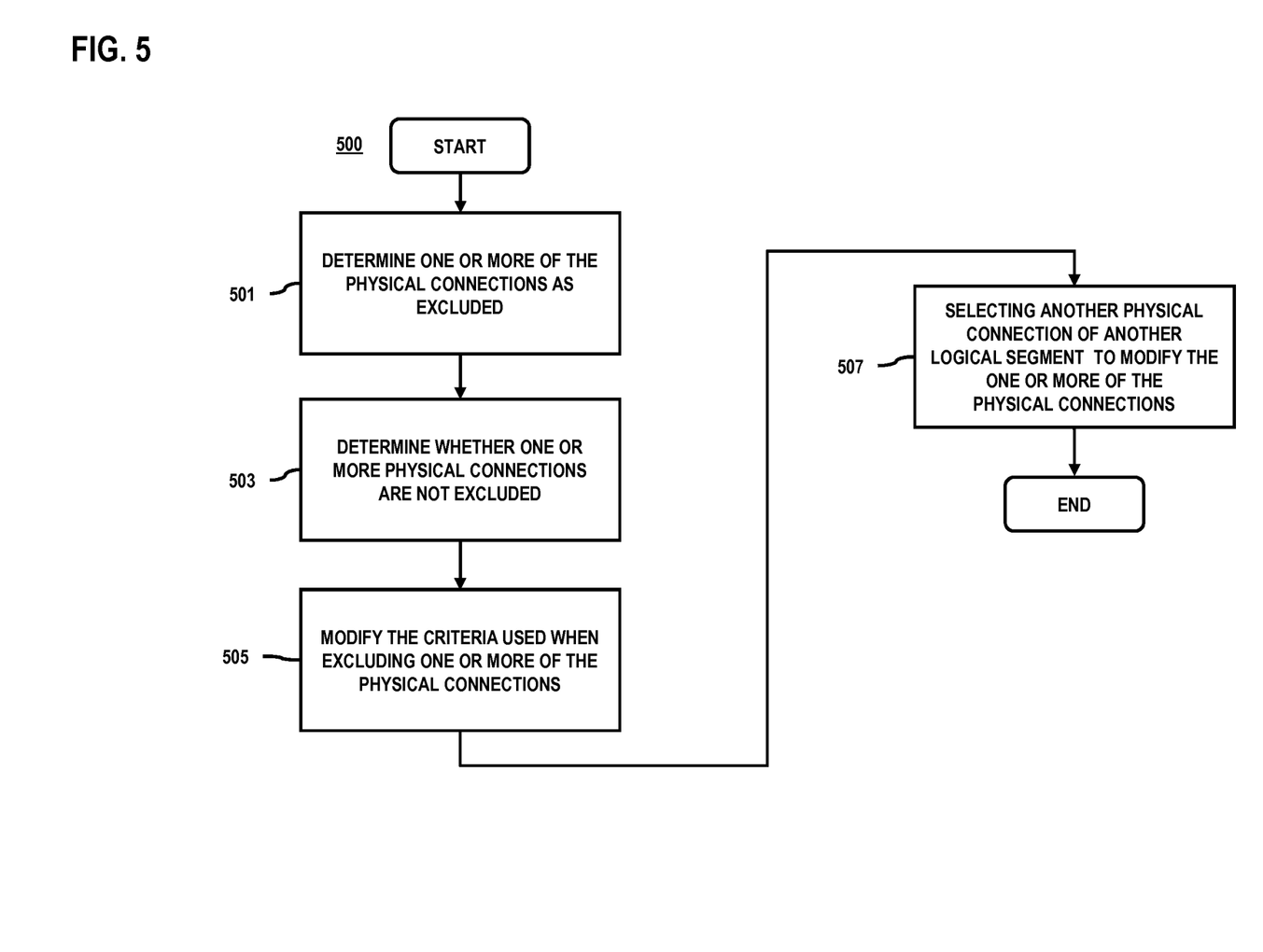
FIG. 5 is a flowchart of a process for resolving a blocked logical sequence for the process if FIG. 4, according to one embodiment.

FIG. 5 is a flowchart of a process for trimming or pruning physical connections from determining a cost value, according to one embodiment. For illustrative purpose, process 500 is described with respect to the system of FIG. 1, and with reference to the diagrams of FIGS. 3, 6A, and 6B. It is noted that the steps of process 500 may be performed in any suitable order, as well as combined or separated in any suitable manner. In step 501, the process 500 determines to exclude (or prune) one or more physical connections from a list of candidate physical connections. In some embodiments, the list refers to one or more physical connections having an associated cost value determined for each of the one or more physical connections, wherein each of the one or more physical connections are capable of being selected in step 409. The criteria used in determining whether to prune or trim a physical connection from the list may include preset thresholds of criteria used for determine a cost value. By way of example, the process 500 may prune physical connections that include more than three entities (as shown in Table 2). Additionally, or alternatively, the process 500 may prune physical connections that include a physical media span length that exceeds a predetermined distance, e.g., five-thousand feet. Further, the process 500 may prune physical connections based on geographic considerations, e.g., a crossing of regional, state, street, local access and transport area boundaries, or based on a connection to a central office or wire center.

Additionally, or alternatively the criteria used in determining whether to prune or trim a physical connection may be unrelated to criteria used for determining a cost value. For example, one or more physical segments may be pruned from the list to enable a minimum safe margin of distance of physical entities. That is, physical entities and/or physical media within a safe margin distance, but not sharing physically elements may nonetheless be treated as sharing physical elements. In this manner, the network reliability may be further improved because actions causing a loss of connectivity (e.g., digging, pole damage, manhole flooding, etc.) frequently cause a loss of connectivity to all physical elements within an area. Pruning to ensure a minimum safe margin of distance of physical entities may be achieved by discarding physical entities infringing (or within) the minimum safe margin of distance (e.g., twenty-five feet) from nodes or from other physical entities. For example, assuming that entity e3 shown in FIG. 3, and in Table 2 violates the minimum safe margin of distance with node b, then physical segments $f_{11}$, $f_{13}$, $f_{14}$, $f_{16}$, $f_{18}$, $f_{19}$, $f_{62}$ listed in Table 2 are discarded as shown in Table 3:

TABLE 3

| $L_1$ LS(A-B) | $L_2$ LS(B-C) | $L_3$ LS(C-D) | $L_4$, $L_5$ | $L_6$ LS(AG) | $L_7$ LS(G-H) | $L_8$, $L_9$, $l_{10}$ |
|---|---|---|---|---|---|---|
| $f_{12}$ A-e1-e2-B | $f_{21}$ B-e6-e8-C | $f_{31}$ C-e8-D | Not Shown | $f_{61}$ A-e4-e5-G | $f_{71}$ G-e7-H | Not Shown |
| $f_{15}$ A-e4-e5-B | $f_{22}$ B-e2-e6-e8-C | $f_{32}$ C-e8-e10-D | | | $f_{72}$ G-e13-H | |
| $f_{17}$ A-e1-e2-e6-B | $f_{23}$ B-e7-e6-e8-C | $f_{33}$ C-e9-e12-D | | | $f_{73}$ G-e13-e9-H | |
| | $f_{24}$ B-e6-e8-e11-C | $f_{34}$ C-e11-e8-D | | | | |
| | | $f_{35}$ C-e11-e10-D | | | | |
| | | $f_{36}$ C-e11-e12-D | | | | |
| | | $f_{37}$ C-e8-e11-e10-D | | | | |
| | | $f_{38}$ C-e8-e11-e12-D | | | | |
| | | $f_{39}$ C-e11-e8-e10-D | | | | |

Furthermore, the process 500 may include virtual or pseudo entities to maintain a minimum safe margin of distance between physical segments. As used herein, "virtual or pseudo" entities indicate a violation of a minimum safe margin of distance between physical segments (e.g., optical fiber cable), and are treated as physical entities. In this manner, the process 500 utilizes virtual entities to account for instances where the entities at the ends of a physical segment meet safe margin distances, but some portion of the intermediate physical segments do not meet safe margins. By way of example, if a physical segment connecting entities e10 and e11 (illustrated in FIG. 3) violates (or is within) a minimum safe margin of distance with physical segment connecting entity e8 with node d, then a virtual entity is placed at the location of the violation (e.g., at the intersection). The virtual entity restricts the selection of both the first physical segment connecting entities e10 and e11, and, the second physical segment connecting entity e8 with node d; i.e., only one of them could be selected. In this manner, the process 500 maintains a minimum safe margin of distance between the first physical segment and the second physical segment resulting in a higher overall network reliability. It is contemplated that virtual or pseudo entities can include specific x-y-z coordinates.

In step 503, the process 500 determines whether one or more physical connections are not excluded (or is on the list). The result of the determination is used to modify the criteria, as in step 505. By way of example, if the determination results in a large amount (e.g., one-hundred) of physical connections being on the list, then the modified criteria may be added to further reduce results on the list. Alternatively, if the determination results in few or no physical connections (i.e., blocking) on the list, then the criteria may be eased to increase results on the list.

As noted previously, various criteria may be used to determine one or more of the physical connections as excluded (or pruned) and, depending on the results of step 503, this pruning criteria may be adjusted. For example, the modification may involve broadening or narrowing the results domain: e.g., add a limitation on the number of physical entities, or reducing the limitation on the number of physical entities from five to three.

Next, in step 507, another physical connection of another logical segment is selected for modification. In one embodiment, if the physical connections on the list are insufficient (i.e., blocking) then the process 500 reverts or backtracks to a previously determined logical segment, excludes the previously selected physical connection, and selects a different physical connection for the previously determined logical segment.

Figure 6A:
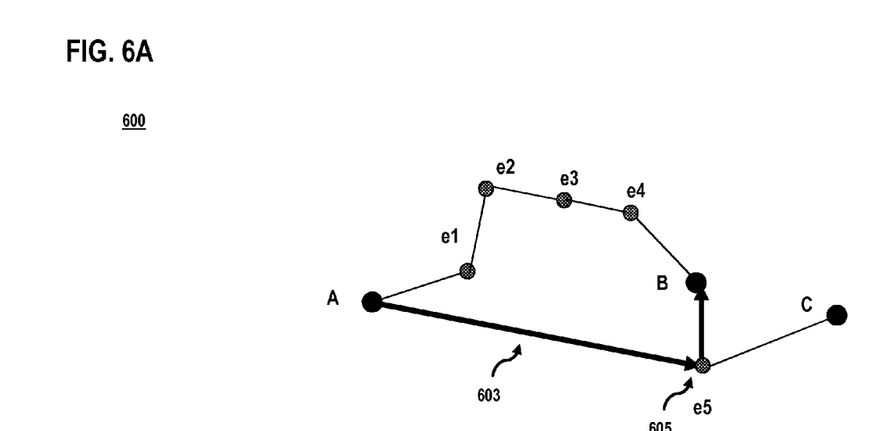
FIGS. 6A and 6B are diagrams of an exemplary network topology for which the process in FIG. 5 is applied.
Figure 6B:
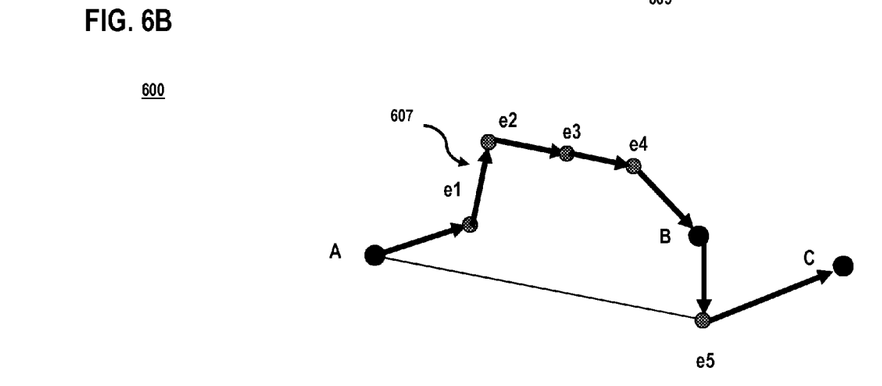

FIGS. 6A and 6B are diagrams of an exemplary network topology for which the process in FIG. 5 is applied. In FIG. 6A, the selection of physical segment 603 results in no physical connection being on the list to connect node b to node c, because the entity 605 is excluded from the list because it is contained in the physical segment 603. In the exemplary embodiment, the process reverts back to selecting a physical segment connecting node a and b and excludes the physical segment 603 from consideration. Although the physical segment 607, as shown in FIG. 6B, includes more physical entities than physical segment 603 (resulting in a higher cost value), the selection of physical segment 607 allows a physically diverse connection to node c. Thus, the process 500 selects another physical segment (e.g., physical segment 607 instead of physical segment 603) of another logical segment (e.g., a logical segment connecting nodes a and b instead of a logical segment connecting nodes b and c) to modify the one or more of the physical connections (e.g., allowing for a physical connection via entity 605.) It is contemplated that the process 500 may revert or backtrack multiple times in order to overcome blocking.

Figure 7:
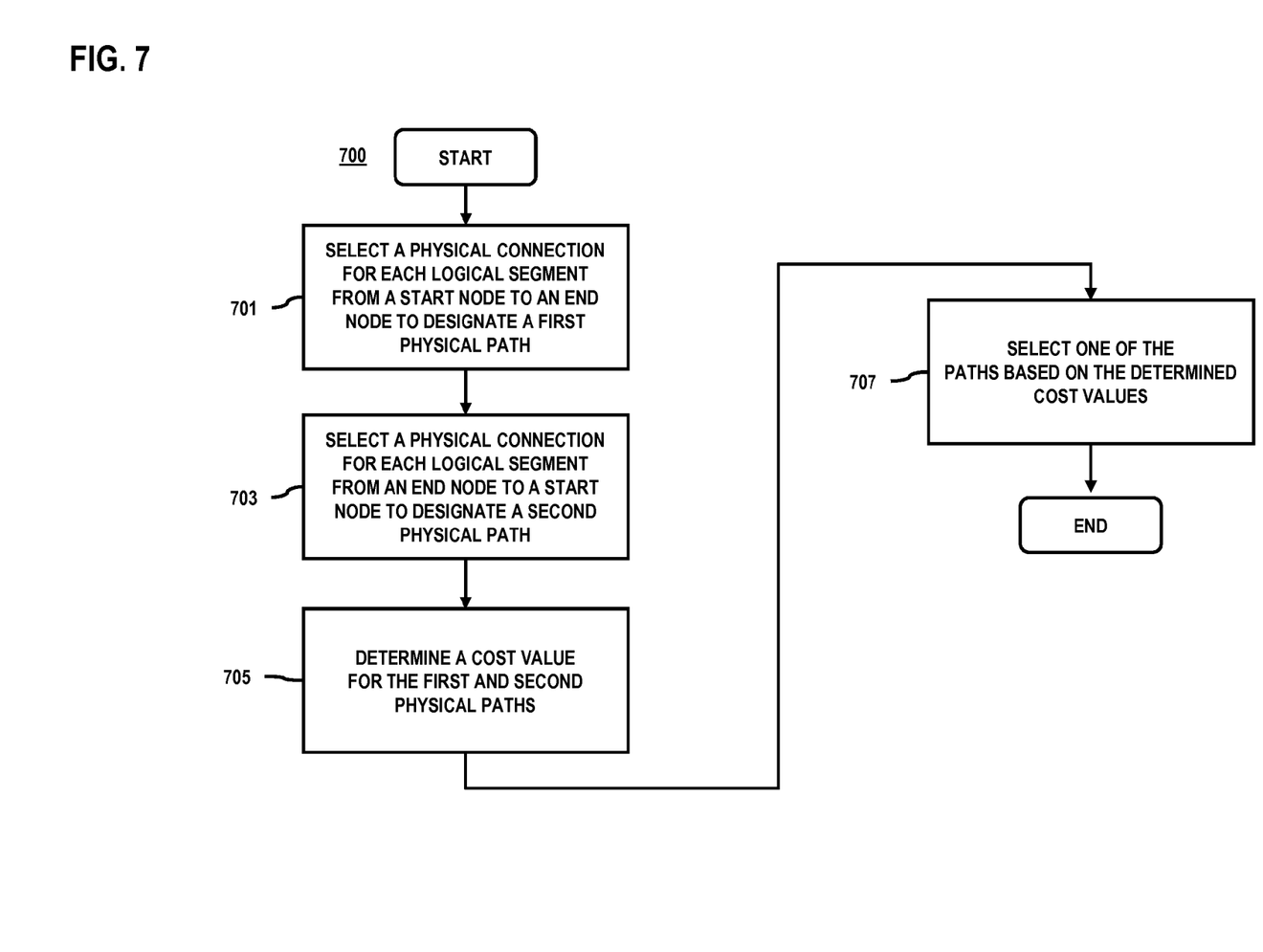
FIG. 7 is a flowchart of a process of finding cost effective network connections while maintaining physical layer diversity by using alternate physically diverse paths, according to one embodiment.
Figure 8A:
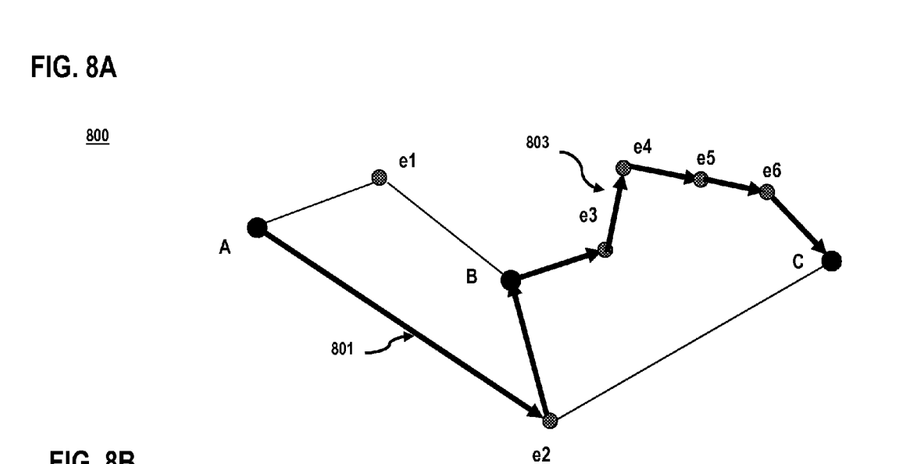
FIGS. 8A and 8B are diagrams of an exemplary network topology for which the process in FIG. 7 is applied.
Figure 8B:
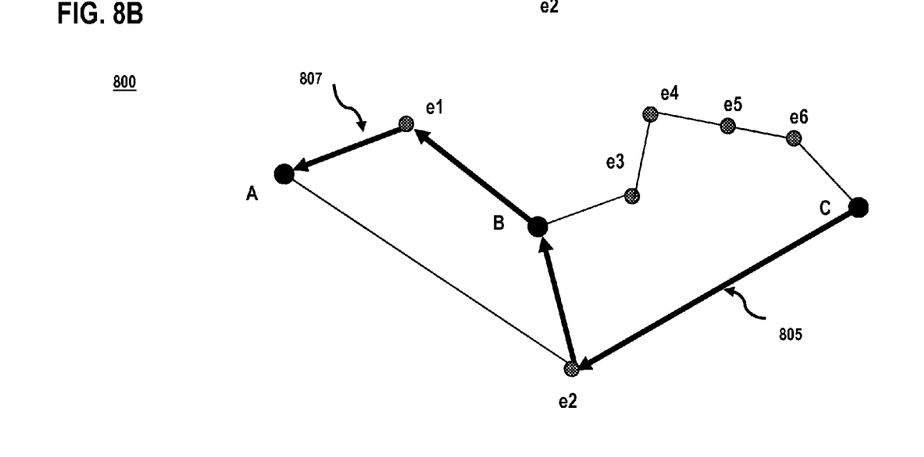

FIG. 7 is a flowchart of a process for finding cost effective network connections while maintaining physical layer diversity by using alternate physically diverse paths, according to one embodiment. For illustrative purpose, process 700 is described with respect to the system of FIG. 1, and with reference to the diagrams of FIGS. 8A, and 8B. It is noted that the steps of process 700 may be performed in any suitable order, as well as combined or separated in any suitable manner. The order of selecting physical segments in a physical path may alter the result of the process. Therefore, the process may include steps to determine alternate physical paths for a single logical path to enable a selection of an efficient physically diverse path. FIGS. 8A and 8B are diagrams of an exemplary network topology for which the process in FIG. 7 is applied In step 701, process 700 selects a physical connection for each logical segment from a start node a to an end node b to designate a first physical path. The process 500 to designate the first physical path may be the process described with respect to the flow charts in FIG. 4 and FIG. 5. For example, with respect to FIG. 2, the physical segments are selected first for connecting nodes a and b (illustrated in FIG. 8A as physical segment 801), and then for connecting nodes b and c (illustrated in FIG. 8A as physical segment 803).

In step 703, the process selects a physical connection for each logical segment from the b end node to start node a to designate a second physical path. The process 703 to designate the first physical path may be the process described with respect to the flowcharts in FIG. 4 and FIG. 5. For example, with respect to FIG. 2, the physical segments are selected first for connecting nodes c and b, (illustrated in FIG. 8B as physical segment 805), and then for connecting nodes b and a (illustrated in FIG. 8B as physical segment 807).

Once the process 700 selects the first and second physical paths, it determines, as in step 705, a cost value for the first and second physical paths. The determination of cost values as previously mentioned may be used. As noted, alternate physical paths for a single logical path may be calculated to determine a more cost effective physical path. In FIG. 8A the exemplary embodiment 800 results in a physical path that includes the following physical entities: e2, e3, e4, e5, and e6. In this example, the alternate physical path shown in FIG. 8B includes only two physical entities (entities e1 and e2) to connect the same logical path (node a to b) as shown in FIG. 8A. Thus, if cost value is determined by the number of physical entities, as in exemplary embodiment 800, the first physical path shown is in FIG. 8A has a cost value of five, while the second physical path shown in FIG. 8B has a cost value of two. Once the process 700 determines a cost value for the first and second physical paths, it selects, as in step 707, one of the paths based on the determined cost values. In the exemplary embodiment 800, the process 700 selects the second path shown in FIG. 8B because the second physical path includes fewer physical entities than the first physical path.

In certain embodiments, the described processes and arrangement enhances network availability by providing path diversity at the physical layer as well as the logical layer.

The processes for finding diverse physical layer paths described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
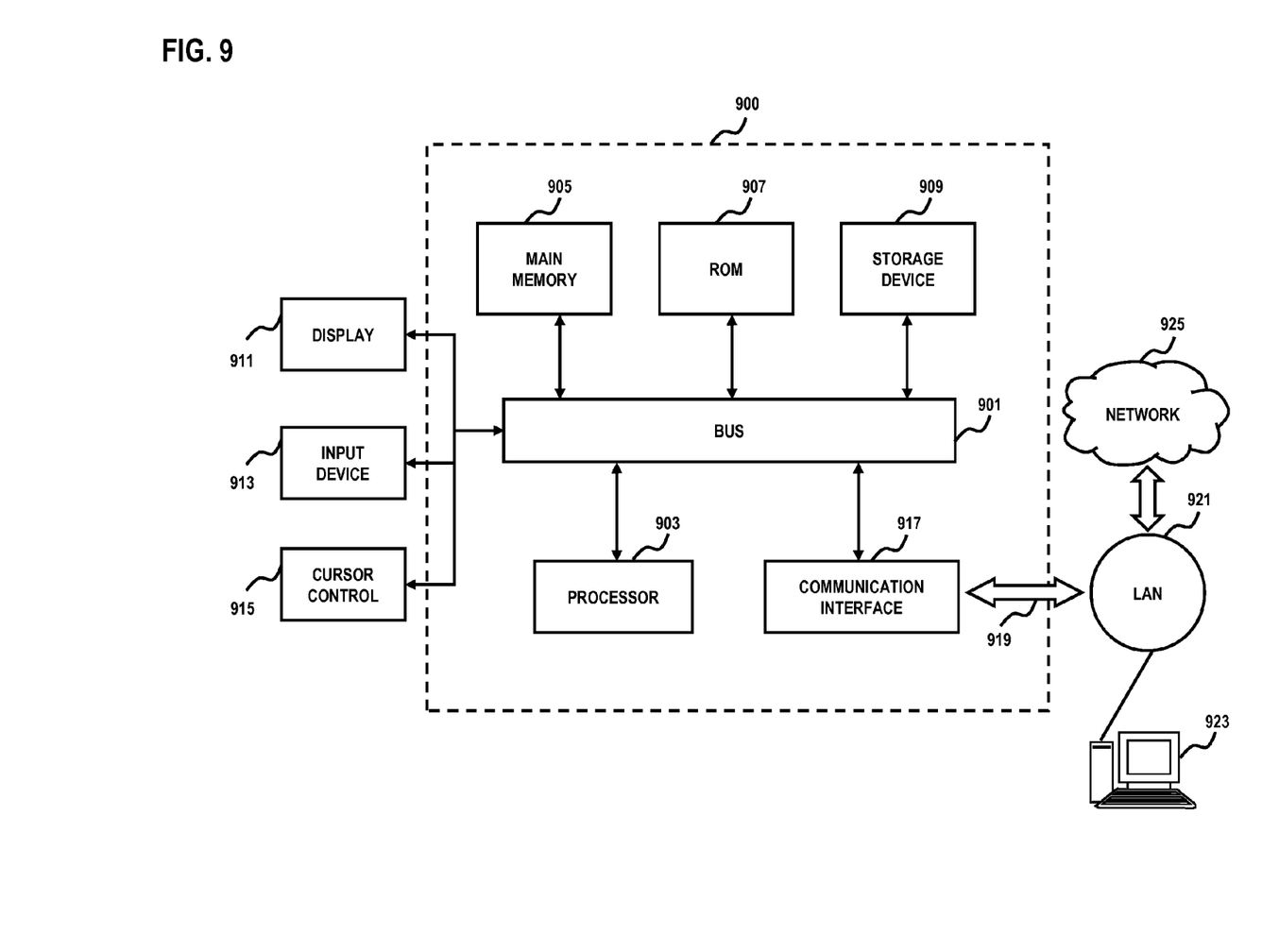
FIG. 9 is a diagram of a computer system that can be used to implement various exemplary embodiments.

FIG. 9 illustrates computing hardware (e.g., computer system) 900 upon which an embodiment according to the invention can be implemented. The computer system 900 includes a bus 901 or other communication mechanism for communicating information and one or more processors (of which one is shown) 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for adjusting cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
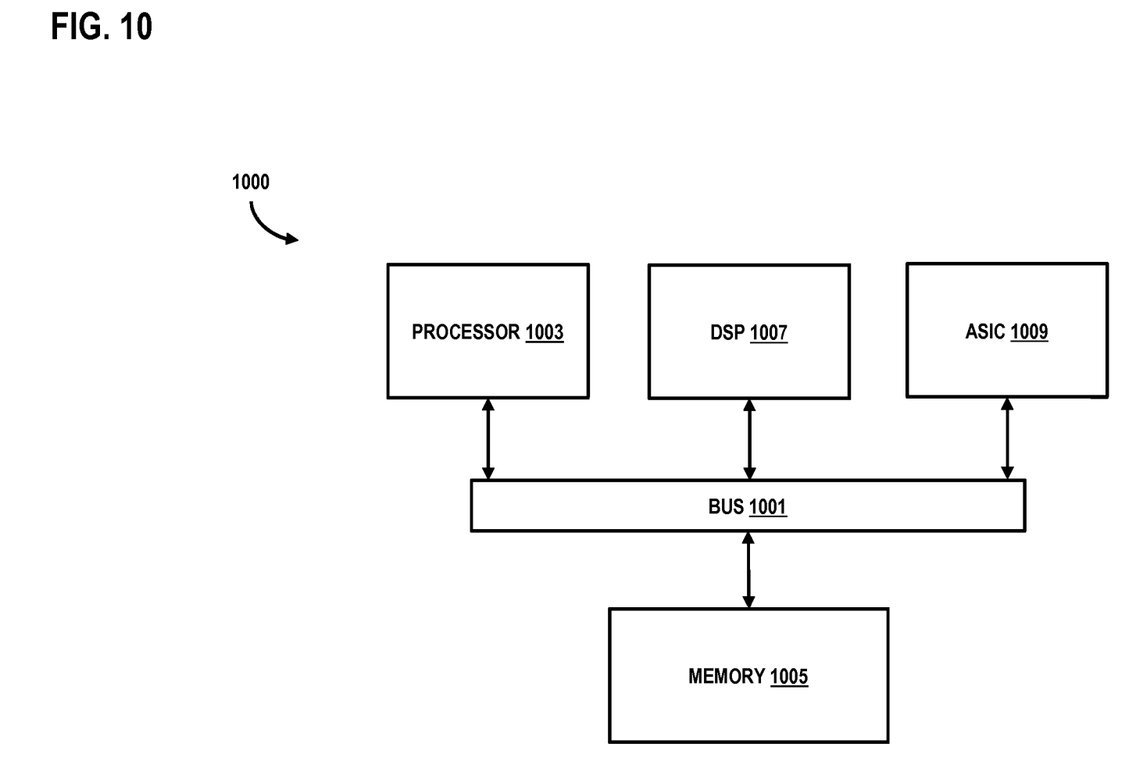
FIG. 10 is a diagram of a chip set that can be used to implement an embodiment of the invention.

FIG. 10 illustrates a chip set or chip 1000 upon which an embodiment of the invention may be implemented. Chip set 1000 is programmed to enable finding diverse physical layer paths as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of enabling finding cost effective network connections while maintaining physical layer diversity.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real-time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to enable finding cost effective network connections while maintaining physical layer diversity. The memory 1005 also stores the data associated with or generated by the execution of the inventive steps.

While certain exemplary embodiments and implementations have been described herein, other embodiments and modifications will be apparent from this description. Accordingly, the invention is not limited to such embodi-

What is claimed is:

1. A method comprising:
    determining a first logical segment within a path between a start node and an end node of a network;
    determining a first plurality of physical connections of the first logical segment;
    selecting one or more of the physical connections in the first plurality based on at least one first plurality criterion associated with one or more physical connections in the first plurality;
    determining a second logical segment between the start node and the end node;
    determining a second plurality of physical connections of the second logical segment,
    wherein the determining of the second plurality excludes the selected physical connections of the first plurality;
    determining a minimum safe margin of distance between one or more of the selected first plurality physical connections associated with a first physical segment and one or more of the selected second plurality physical connections associated with a second physical segment, wherein the selected first plurality physical connections and the selected second plurality physical connections do not share any portion of same physical segments;
    determining a virtual entity associated with the determined minimum safe margin of distance, wherein the virtual entity is a location of a violation of the minimum safe margin of distance;
    utilizing the determined virtual entity to indicate the violation of the minimum safe margin of distance between the one or more of the selected first plurality physical connections associated with the first physical segment and the one or more of the selected second plurality physical connections associated with the second physical segment; and
    selecting one or more of the physical connections in the second plurality based, at least in part, on the virtual entity,
    wherein utilizing the virtual entity restricts the selecting of the one or more of the physical connections in the second plurality and a selecting of the first physical segment and the second physical segment.

2. A method according to claim 1, further comprising: determining a number of physical entities within one or more of the physical connections of
    the determined first or second pluralities and assigning one or more cost values,
    wherein the selecting one or more of the physical connections in the first or the second plurality is based, at least in part, on the assigned cost values.

3. A method according to claim 2, further comprising: determining a span length of physical media of one or more of the physical connections to
    assign one or more of the cost values.

4. A method according to claim 1, further comprising: designating one or more of the physical connections to exclude from the selected physical
    connections based on one or more criteria associated with a safe margin distance, a geographic consideration, or a combination thereof.

5. A method according to claim 4, further comprising: modifying the criteria if the designated physical connections satisfy a threshold.

6. A method according to claim 1, further comprising: selecting a physical connection for each logical segment from a start node to an end node to
    designate a first alternate physical path;
    selecting a physical connection for each logical segment from an end node to an start node to designate a second alternate physical path;
    determining at least one cost value for the first alternate physical path and the second alternate physical path; and
    selecting the first alternate physical path or the second alternate physical path based on the at least one cost value.

7. A method according to claim 1, further comprising: determining whether one or more of the physical connections includes a number of physical
    entities satisfying a threshold to exclude from the selection.

8. A method according to claim 1, further comprising: determining whether one or more of the physical connections includes a span length of
    physical media satisfying a threshold to exclude from the selection.

9. A method according to claim 1, further comprising: determining whether one or more of the physical connections is within a margin distance
    from the start node, the end node, or an intermediate node between the start node and the
    end node, wherein the physical connections within the margin distance are excluded from the selection; or
    determining whether one or more of the physical connections is within a margin distance from a particular one of the physical connections, wherein the physical connections within the margin distance are excluded.

10. A method according to claim 1, wherein the selecting of the one or more of the physical connections in the second plurality excludes physical connections at an end of the second physical segment.

11. An apparatus comprising:
    at least one processor; and
    at least one memory including computer program code for one or more programs,
    the at least one memory and the computer program code configured to, with the at least one processor, cause the apparatus to perform at least the following:
    determine a first logical segment within a path between a start node and an end node of a network,
    determine a first plurality of physical connections of the first logical segment,
    select one or more of the physical connections in the first plurality based on at least one first plurality criterion associated with one or more physical connections in the first plurality,
    determine a second logical segment between the start node and the end node,
    determine a second plurality of physical connections of the second logical segment,
    wherein a determination of the second plurality excludes the selected physical connections of the first plurality,
    determine a minimum safe margin of distance between one or more of the selected first plurality physical connections associated with a first physical segment and one or more of the selected second plurality physical connections associated with a second physical segment, wherein the selected first plurality physical connections and the selected second plurality physical connections do not share same physical segments, determine a virtual entity associated with the determined minimum safe margin of distance, wherein the virtual entity is a location of a violation of the minimum safe margin of distance, utilize the determined virtual entity to indicate the violation of the minimum safe margin of distance between the one or more of the selected first plurality physical connections associated with the first physical segment and the one or more of the selected second plurality physical connections associated with the second physical segment, and select one or more of the physical connections in the second plurality based, at least in part, on the virtual entity, wherein utilizing the virtual entity restricts the selecting of the one or more of the physical connections in the second plurality and a selecting of the first physical segment and the second physical segment.

12. The apparatus according to claim 11, wherein the apparatus is further caused to:

determine a number of physical entities within one or more of the physical connections of the determined first or second pluralities and assign one or more cost values, wherein the selecting one or more of the physical connections in the first or the second plurality is based, at least in part, on the assigned cost values.

13. The apparatus according to claim 12, wherein the apparatus is further caused to:

determine a span length of physical media of one or more of the physical connections to assign one or more of the cost values.

14. The apparatus according to claim 11, wherein the apparatus is further caused to:

designate one or more of the physical connections to exclude from the physical connections based on one or more criteria associated with a safe margin distance, a geographic consideration, or a combination thereof.

15. The apparatus according to claim 14, wherein the apparatus is further caused to:

modify the criteria if the designated physical connections satisfy a threshold.

16. The apparatus according to claim 11, wherein the apparatus is further caused to:

select a physical connection for each logical segment from a start node to an end node to designate a first alternate physical path, select a physical connection for each logical segment from an end node to an start node to designate a second alternate physical path, determine at least one cost value for the first alternate physical path and the second alternate physical path, and select the first alternate physical path or the second alternate physical path based on the at least one cost value.

17. The apparatus according to claim 11, wherein the apparatus is further caused to:

determine whether one or more of the physical connections includes a number of physical entities satisfying a threshold to exclude from the selection.

18. The apparatus according to claim 11, wherein the apparatus is further caused to:

determine whether one or more of the physical connections includes a span length of physical media satisfying a threshold to exclude from the selection.

19. The apparatus according to claim 11, wherein the apparatus is further caused to:

determine whether one or more of the physical connections is within a margin distance from the start node, the end node, or an intermediate node between the start node and the end node, wherein the physical connections within the margin distance are excluded from the selection, or determine whether one or more of the physical connections is within a margin distance from a particular one of the physical connections, wherein the physical connections within the margin distance are excluded.

20. An apparatus according to claim 11, wherein the selecting of the one or more of the physical connections in the second plurality excludes physical connections at an end of the second physical segment.

* * * * *